United States Patent
Yoshimura et al.

(10) Patent No.: US 6,874,856 B2
(45) Date of Patent: Apr. 5, 2005

(54) WHEEL BALANCE WEIGHT AND PROCESS FOR MANUFACTURING THE SAME

(75) Inventors: Yasunori Yoshimura, Wako (JP); Eiji Suzuki, Wako (JP); Yoshihiro Ichimura, Wako (JP); Yoichiro Inaba, Wako (JP); Yutaka Yamaguchi, Higashikamo-gun (JP)

(73) Assignees: Honda Giken Kogyo Kabushiki Kaisha, Tokyo (JP); Toho Kogyo Co., Ltd., Aichi-ken (JP)

( * ) Notice: Subject to any disclaimer, the term of this patent is extended or adjusted under 35 U.S.C. 154(b) by 0 days.

(21) Appl. No.: 10/395,060

(22) Filed: Mar. 25, 2003

(65) Prior Publication Data

US 2003/0197421 A1 Oct. 23, 2003

(30) Foreign Application Priority Data

Apr. 17, 2002 (JP) ...................... 2002-115264

(51) Int. Cl.⁷ .............................................. F15F 15/32
(52) U.S. Cl. ..................................................... 301/5.21
(58) Field of Search ........................................ 301/5.21

(56) References Cited

U.S. PATENT DOCUMENTS

| | | | | | |
|---|---|---|---|---|---|
| 2,029,132 A | * | 1/1936 | Skelton | ...................... | 301/5.21 |
| 2,122,064 A | * | 3/1938 | Hume | ........................ | 301/5.21 |
| 2,459,568 A | * | 1/1949 | Lyon | .......................... | 29/413 |
| 2,640,727 A | * | 6/1953 | Kennedy | ................... | 301/5.21 |
| 2,950,142 A | * | 8/1960 | Lyon | ......................... | 301/5.21 |
| 3,273,941 A | * | 9/1966 | Skidmore | .................. | 301/5.21 |
| 3,960,409 A | * | 6/1976 | Songer | ...................... | 301/5.21 |
| 4,300,803 A | * | 11/1981 | Chorosevic | ................ | 301/5.21 |
| 6,364,421 B1 | * | 4/2002 | Pursley | ...................... | 301/5.21 |
| 6,413,626 B1 | * | 7/2002 | Wollner | .................. | 428/317.3 |
| 6,659,567 B2 | * | 12/2003 | Yamaguchi | ................ | 301/5.21 |

FOREIGN PATENT DOCUMENTS

| | | |
|---|---|---|
| DE | 101 02 321 | 2/2002 |
| DE | 10102321 A1 * | 2/2002 |
| EP | 1 128 176 | 8/2001 |
| JP | 2001173723 | 6/2001 |
| WO | 99/55924 | 11/1999 |

* cited by examiner

*Primary Examiner*—Russell D. Stormer
(74) *Attorney, Agent, or Firm*—Jacobson Holman PLLC

(57) ABSTRACT

A wheel balance weight includes a weight and an installation member. The weight is composed of at least one member selected from the group consisting of zinc and a zinc-based alloy, is formed as a substantially strip shape having a substantially uniform thickness, and has opposite surfaces and at least a groove. The groove is formed in at least one of the opposite surfaces of the weight, and crosses in the width-wise direction of the weight. The installation member is adapted for installing the weight to a rim in a wheel. Since the weight is composed of zinc or a zinc-based alloy, environments are inhibited from being polluted when the wheel balance weight is abolished. Moreover, it is possible to manufacture the wheel balance weight at reduced costs and install it to wheels with ease.

23 Claims, 7 Drawing Sheets

WHEEL BALANCE WEIGHT AND PROCESS FOR MANUFACTURING THE SAME

BACKGROUND OF THE INVENTION

1. Field of the Invention

The present invention relates to a wheel balance weight. In particular, it relates to a wheel balance weight which is installed to an inner peripheral surface of a rim in a wheel of a vehicle.

2. Description of the Related Art

In a wheel-assembled state; namely: in a state where a tire of an automobile, or the like, is assembled with a wheel, there arises a drawback in that, as the imbalance enlarges in the peripheral direction around the rotary shaft of the wheel assembly as well as in the direction of the rotary shaft of the wheel assembly, the vibrations, noises, and the like, generate when driving a vehicle.

The vibrations, noises, and soon, result from the imbalance in the wheel. Accordingly, the wheel is equipped with a wheel balance weight, which can cancel the imbalance. The installation position of the wheel balance weight to the wheel and the mass of the wheel balance weight are determined by measuring the imbalance of the wheel assembly with a special purpose measuring apparatus.

As one of the conventional wheel balance weights, there has been, for example, a wheel balance weight, which is installed to an inner peripheral surface of a rim in the wheel by bonding a substantially plate-shaped weight, having a predetermined mass, by means of an adhesive tape, etc.

When the conventional wheel balance weight is manufactured, the weight is formed as a flat plate shape. When it is installed to the wheel, the weight is curved along the inner peripheral surface of the rim in the wheel. Moreover, since the curvature of the conventional wheel balance weight depends on the curvature of the wheels to which it is installed, it is determined appropriately.

In the conventional wheel balance weight, the weight has been formed of lead, which is one of soft materials. The weight, which is formed of lead, can be readily processed, and can be readily curved with a manual labor.

However, it has been known that lead puts a large load onto environment when it is abolished.

SUMMARY OF THE INVENTION

The present invention has been developed in view of the aforementioned circumstances. It is therefore an object of the present invention to provide a wheel balance weight, which puts a less load onto environment when it is abolished.

In order to carry out the object, the inventors of the present invention repeatedly investigated the materials of the weight. As a result, they found out that it is possible to achieve the object by making a weight which is composed of zinc or a zinc-based alloy. Thus, they completed the present invention.

For example, a wheel balance weight according to the present invention is characterized in that it comprises:

a weight being composed of at least one member selected from the group consisting of zinc and a zinc-based alloy, being formed as a substantially strip shape having a substantially uniform thickness, and having opposite surfaces and at least a groove, the groove being formed in at least one of the opposite surfaces of the weight and crossing in the width-wise direction thereof; and installation means for installing the weight to a rim in a wheel.

In the present wheel balance weight, the weight is composed of zinc or a zinc-based alloy which puts a less load onto environment. Therefore, even when the present wheel balance weight is abolished, the surrounding environments are inhibited from being polluted. Moreover, zinc or a zinc-based alloy exhibits a relatively low temperature so that it can be readily processed. Hence, it is possible to manufacture the present wheel balance weight at reduced costs and install it to wheels with ease.

A manufacturing process according to the present invention is adapted for manufacturing the present wheel balance weight, and is characterized in that it comprises the steps of:

forming a weight being composed of at least one member selected from the group consisting of zinc and a zinc-based alloy, being formed as a substantially strip shape having a substantially uniform thickness, and having opposite surfaces and at least a groove, the groove being formed in at least one of the opposite surfaces of the weight and crossing in the width-wise direction thereof; and applying a double-sided tape, having opposite adhesive surfaces, to the weight so as to adhere one of the opposite adhesive surfaces onto one of the opposite surfaces of the weight.

In accordance with the present process for manufacturing the present wheel balance weight, it is possible to manufacture the present wheel balance weight which comprises the weight being composed of zinc or a zinc-based alloy. Specifically, zinc or a zinc-based alloy puts a less load onto environment, and can be readily processed. Therefore, in accordance with the present manufacturing process, it is possible to manufacture the present wheel balance weight, which puts a less load onto environment, with ease.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
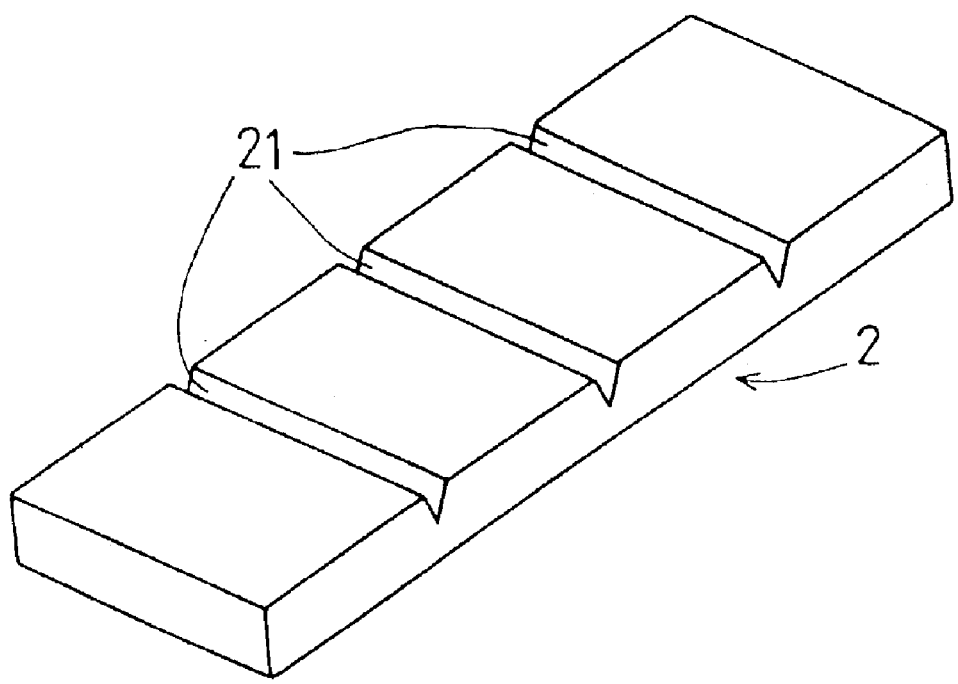
FIG. 1 is a perspective view for illustrating a strip-shaped weight in a wheel balance weight of Example No. 1 according to the present invention.

Having generally described the present invention, a further understanding can be obtained by reference to the specific preferred embodiments which are provided herein for the purpose of illustration only and not intended to limit the scope of the appended claims.

Wheel Balance Weight

A wheel balance weight according to the present invention comprises a weight and installation means. The weight is composed of at least one member selected from the group consisting of zinc and a zinc-based alloy, is formed as a substantially strip shape having a substantially uniform thickness, and has opposite surfaces and at least a groove. The groove is formed in at least one of the opposite surfaces of the weight, and crosses in the width-wise direction of the weight. The installation means is adapted for installing the weight to a rim in a wheel. In the present wheel balance weight, the weight is composed of zinc or a zinc-based alloy which puts a less load onto environment. Therefore, even when the present wheel balance weight is abolished, the surrounding environments are inhibited from being polluted. Moreover, zinc or a zinc-based alloy exhibits a relatively low temperature so that it can be readily processed. Hence, it is possible to manufacture the present wheel balance weight at reduced costs and install it to wheels with ease.

In the present wheel balance weight, zinc or a zinc-based alloy constitutes the weight. Zinc herein refers to pure zinc. The zinc-based alloy herein refers to alloys in which zinc makes a major component substantially. Specifically, the zinc-based alloy refers to zinc alloys whose zinc content is 39.5% by weight or more when the entirety is taken as 100% by weight. The zinc content can further preferably be 45% by weight or more, furthermore preferably be 50% by weight or more, moreover preferably be 90% by weight or more.

Further, the weight can preferably be composed of a zinc-based alloy which comprises tin in an amount of less than 50% by weight, copper in an amount of less than 5% by weight, aluminum in an amount of less than 5% by weight, and the balance of zinc and inevitable impurities. The content of tin can further preferably be from 0 to 50% by weight, furthermore preferably be from 0 to 0.01% by weight. The content of copper can further preferably be from 0 to 5% by weight, furthermore preferably be from 0 to 1% by weight. The content of aluminum can further preferably be from 0 to 4.5% by weight, furthermore preferably be from 3.5 to 4.5% by weight. The content of inevitable impurities can be less than 1.5% by weight, further preferably be less than 0.5% by weight. When the weight is composed of the zinc-based alloy including these components, it is possible to secure process ability which is required for the weight of the present wheel balance weight.

Furthermore, when the weight is composed of zinc or the zinc-based alloy, the weight exhibits corrosion resistance of itself by the formation of passive films or the sacrificial rust prevention action. The passive films are composed of dense oxide films. Thus, the weight is inhibited from corroding. Accordingly, the weight is hardly suffered from the mass variation or damages which result from the corrosion. As a result, the longevity of the present wheel balance weight can be extended.

Moreover, the weight has at least a groove, which is formed in at least one the opposite surfaces of the weight and which crosses in the width-wise direction. Since the weight has the groove, the thickness of the weight is reduced partially at the portion in which the groove is formed. In other words, the weight exhibits a lowered rigidity at the portion in which the groove is formed than at the other portions which are free from the groove or which have a larger thickness. Accordingly, when the present wheel balance weight is curved along a curved inner peripheral surface of a rim in a wheel in order to install the present wheel balance weight to the wheel, the weight can be bent at the portion in which the groove is formed. Thus, a curved shape is formed which goes along the inner peripheral surface of the rim in the wheel. Consequently, when the present wheel balance weight is installed to the wheel, it is possible to carry out the installation by curving the weight with a less force.

Regarding the surface of the weight in which the groove is formed, it is not limited in particular. Namely, the groove can be formed in the opposite top surface of the weight, or can be formed in the opposite bottom surface thereof. In addition, the groove can be formed in both of the opposite top and bottom surfaces. Note that the opposite top surface of the weight herein means one of the opposite surfaces of the weight which faces radially inwardly the axial center of the wheel when the present wheel balance weight is installed to the wheel, and the opposite bottom surface of the weight herein means the other one of the opposite surfaces of the weight which faces the wheel radially outwardly, or which contacts with the inner peripheral surface of the rim in the wheel, when the present wheel balance weight is installed to the wheel.

However, the groove can preferably be formed in the opposite bottom surface of the weight. When the groove is formed in the opposite bottom surface of the weight, it is possible to readily curve the weight along the inner peripheral surface of the rim in the wheel in installing the present wheel balance weight to the wheel. In particular, when the weight is curved, it is compressed on the opposite top surface side, and is extended on the opposite bottom surface side. Since the groove is formed in the opposite bottom surface of the weight, the width of the groove is widened when the weight is curved. When the width of the groove is widened, the length of the weight is prolonged on the opposite bottom-surface side of the weight. This phenomenon implies that the weight is not adversely affected by the ductility of zinc or the zinc-based alloy which makes the weight, and that the weight can be curved with a reduced force as well.

Further, when the groove is formed in the opposite bottom surface of the weight, it is possible to make the opposite top surface of the wheel smooth or free from irregularities. Thus, it is possible not only to upgrade the appearance of the present wheel balance weight, but also to effect an advantage in that finger tips of operators are inhibited from being hurt by such irregularities during the installation of the present wheel balance weight to wheels.

The weight is formed substantially as a strip shape having a substantially uniform thickness. The thickness of the weight herein refers to the thickness of the portions of the weight which are free from the groove. Here, the thickness of the weight is not limited in particular. Namely, the thickness can be a thickness which gives a desired mass to the weight. When the thickness of the weight is substantially uniform, it is possible to adjust the mass of the weight with ease. For example, when the dimensions of the weight are adjusted in the width-wise and longitudinal directions, it is possible to give a desired mass to the weight.

Moreover, when the thickness of the weight is substantially uniform, the present wheel balance weight is installed to wheels with improved installation property. Namely, since the present wheel balance weight hardly requires excessive installation spaces in the thickness-wise direction when it is installed to wheels, it can be installed to a variety of wheels. Specifically, along with the recent trend of developing high-performance vehicle, the performance of the brake system has been improved as the power output is improved. As one of the improvements on the brake system performance, it has been intended to diametrically enlarge brakes. The diametric enlargement of brakes results in the decrement of the space between the inner peripheral surface of wheels and the outer peripheral surface of brakes (i.e., the installation space for wheel balance weights) within wheels. However, since the weight of the present wheel balance weight has a substantially uniform thickness, it is possible to install the present wheel balance weight without being interfered by brakes even when it is disposed at radially outwardly with respect to brakes.

In addition, the installation means is not limited in particular as far as it can install the weight to a rim in a wheel. For example, the installation means can be the same means as a variety of installation means which have been used to install conventional wheel balance weights. Specifically, it is possible to name a clip which hooks the weight at peripheral ends of a rim in a wheel, and a double-sided tape which bonds the weight with a rim in a wheel.

However, the installation means can preferably be a double-sided tape which has opposite adhesive surfaces, which are disposed back to back with each other. One of the adhesive surfaces is to be bonded onto the weight. The other one of the adhesive surfaces is to be bonded onto a rim in a wheel. When the installation means is such a double-sided tape, it is possible to install the present wheel balance weight to an inner peripheral surface of a rim in a wheel so that the appearance of the wheel is not impaired. Moreover, since such a less expensive double-sided tape is used as the installation means, it is possible to reduce the material costs of the present wheel balance weight. In addition, such a double-sided tape enables the present wheel balance weight to produce advantage in that no special devices are needed when the present wheel balance weight is installed to wheels.

Figure 2:
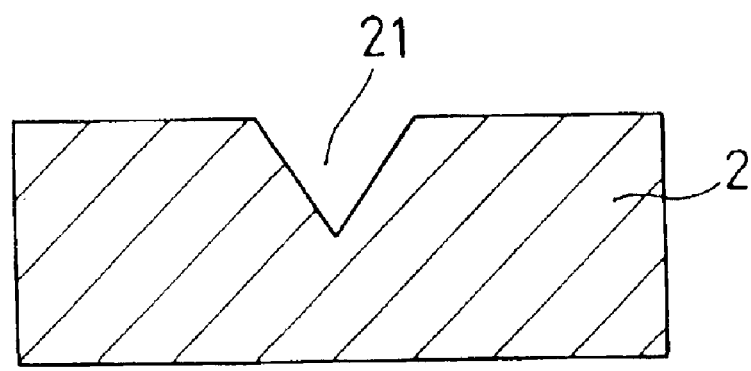
FIG. 2 is a drawing for illustrating a cross section of the weight which is provided with a groove in the wheel balance weight of Example No. 1.
Figure 3:
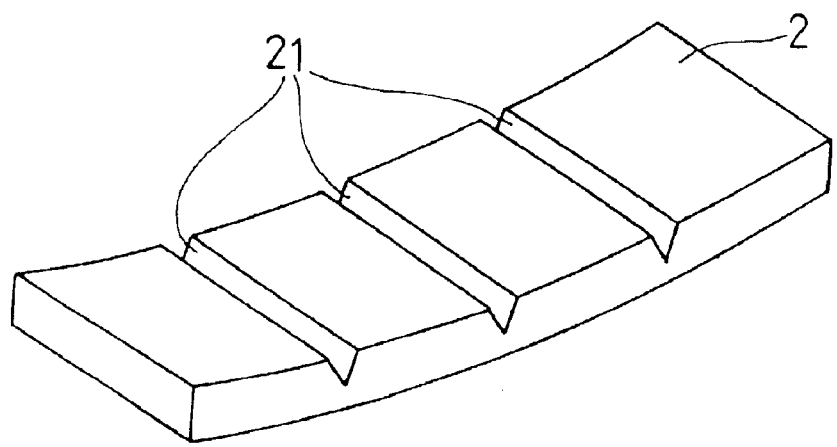
FIG. 3 is a perspective view for illustrating the curved weight in the wheel balance weight of Example No. 1.
Figure 4:
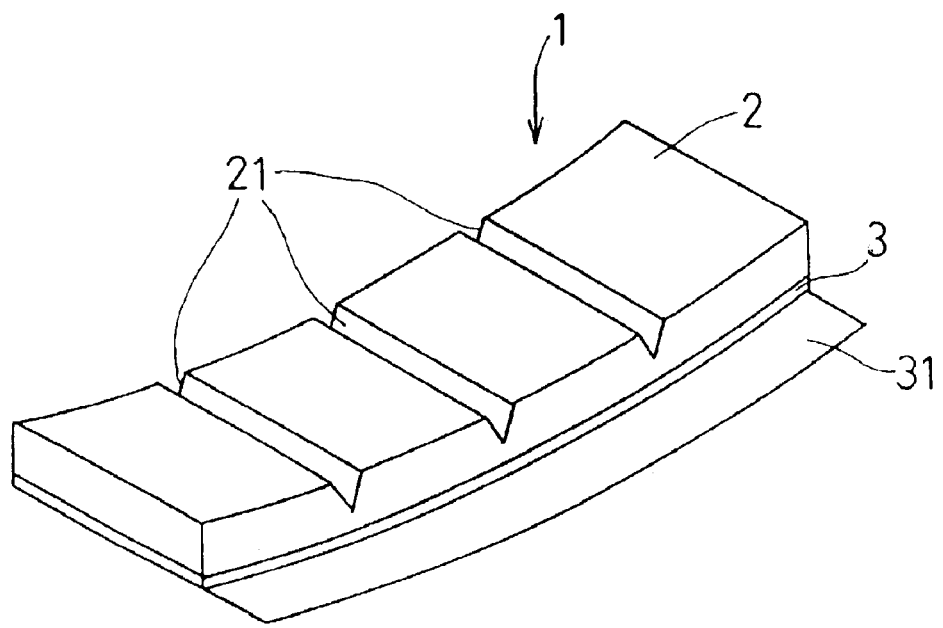
FIG. 4 is a perspective view for illustrating the completed wheel balance weight of Example No. 1.
Figure 9:
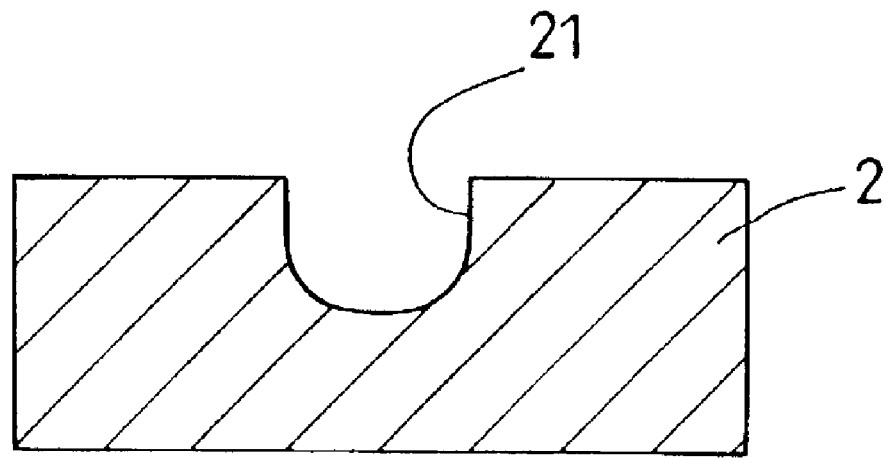
FIG. 9 is a drawing for illustrating a cross section of a weight which is provided with a letter "U"-shaped groove.
Figure 10:
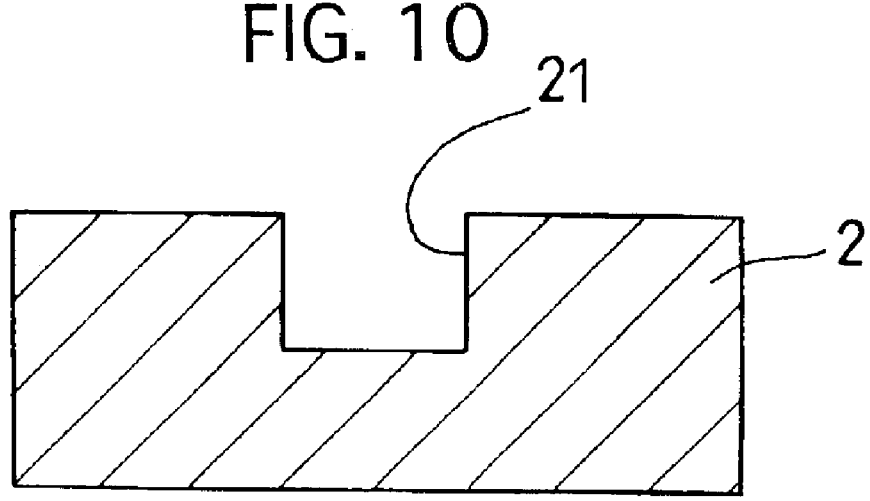
FIG. 10 is a drawing for illustrating a cross section of a weight which is provided with a square-shaped dented groove.

The cross sectional shape of the groove is not limited in particular, either. For example, the cross sectional shape of the groove can be shapes which enable the weight to curve along an inner peripheral surface of a rim in a wheel when the present wheel balance is installed to the wheel. Note that the cross sectional shape of the groove refers to the cross sectional shape in the perpendicular direction with resect to the extending direction of the groove. As for the cross sectional shape of the groove, it is possible to name such shapes as a substantially letter "V" shape (see FIG. 2), a substantially letter "U" shape (see FIG. 9), and a squarely dented shape (see FIG. 10). The cross sectional shape of the groove can further preferably be such that the width at the opening is greater than the width at the bottom.

Figure 11:
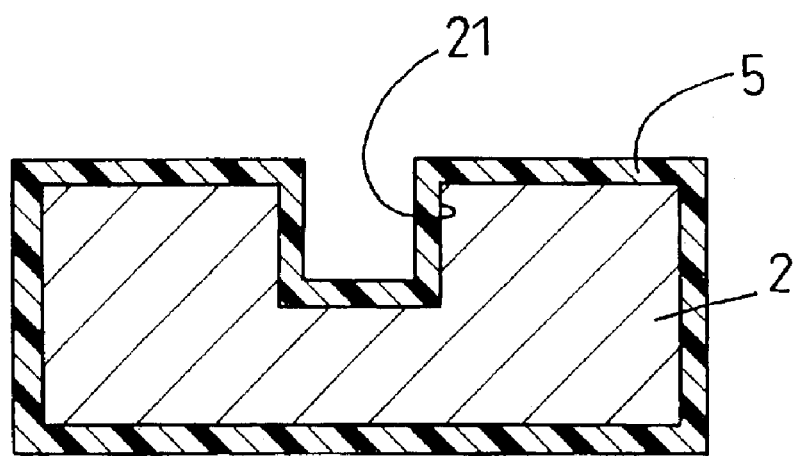
FIG. 11 is a drawing for illustrating a cross section of a weight which is provided with a rust prevention film.

The weight can preferably be provided with a rust prevention film on the opposite top and bottom surfaces at least. When the weight is provided with a rust prevention film, the weight is inhibited from rusting. Moreover, when the weight is provided with a rust prevention film, the weight is inhibited from degrading the appearance. The appearance degradation is caused by the white rust which is generated when the weight being composed of zinc or the zinc-based alloy is oxidized. The rust prevention film is not limited in particular. However, the rust prevention film can preferably be an acrylic resin film 5 as illustrated in FIG. 11, because such an acrylic resin film 5 can upgrade the appearance of the weight. In addition, the acrylic resin film 5 can further preferably be a metallic color film.

The weight can preferably be curved so as to go along an inner peripheral surface of a rim in a wheel. "The weight is curved so as to go along an inner peripheral surface of rim in a wheel" herein designates that the weight is curved at portions in which no groove is formed. When the weight of the present wheel balance weight is curved so as to go along an inner peripheral surface of a rim in a wheel, it is possible to install the present wheel balance weight to the inner peripheral surface with ease.

Moreover, it is preferable to give an identification mark to the opposite top surface of the weight of the present wheel balance weight. For example, when the opposite top surface is marked with a mass of the weight, it is possible to readily identify and select a weight which has a desired mass. It is not limited, either, in terms of the way to give the identification mark to the opposite top surface of the weight.

A process for manufacturing a wheel balance weight according to the present invention comprises a weight forming step and a double-sided tape applying step. In the weight forming step, a weight is formed. The resulting weight is composed of at least one member selected from the group consisting of zinc and a zinc-based alloy, is formed as a substantially strip shape having a substantially uniform thickness, and has opposite surfaces and at least a groove. The groove is formed in at least one of the opposite surfaces of the weight, and crosses in the width-wise direction of the weight. In the double-sided tape applying step, a double-sided tape, having opposite adhesive surfaces, is applied to the weight so as to adhere one of the opposite adhesive surfaces onto one of the opposite surfaces of the weight.

In accordance with the present manufacturing, it is possible to manufacture the present wheel balance weight which comprises the weight being composed of zinc or the zinc-based alloy. Specifically, zinc or the zinc-based alloy puts a less load onto environment, and can be readily processed. Therefore, in accordance with the present manufacturing process, it is possible to manufacture the present wheel balance weight, which puts a less load onto environment, with ease.

In the present manufacturing process, the weight forming step and the double-sided tape applying step are not limited in particular. As for the weight forming step and the double-sided tape applying step, it is possible to use means which have been used in manufacturing conventional wheel balance weights. Except for zinc or the zinc-based alloy making the weight, materials used in the present manufacturing process are not limited, either.

For example, the weight forming step can preferably be a step of manufacturing the weight by casting zinc or the zinc-based alloy. Specifically, when the weight is formed by casting, it is possible to form the weight having a desired shape with ease. Moreover, since the weight is composed of the zinc-based alloy, it is possible to manufacture the weight by pouring a molten metal, in which raw metallic materials are solved, into a mold having cavities with a desired shape. Thus, it is possible to readily manufacture the weight having a desired shape.

Moreover, the weight forming step can preferably be a step of forming the weight by pressing a plate-shaped member being composed of zinc or the zinc-based member. Since the weight is formed by pressing, the formed weight is improved in terms of the dimensional accuracy. As a result, it is possible to readily cancel the imbalance in wheels with the present wheel balance weight. Specifically, when the dimensional accuracy is upgraded, it is easy to find the center of gravity in the present wheel balance weight. Accordingly, it is possible to install the present wheel balance to wheels with enhanced installation accuracy. In addition, when the entire weight is subjected to pressing forming, the weight is compressed to enlarge the density. When the density is enlarged, it is possible to reduce the size of the weight.

Here, the press forming in the weight forming step is not limited in particular as far as it is a method in which the weight can be formed by compressing a plate-shaped, or wire-shaped member. For example, it is possible to name such means as cold forging, punching, cutting and stamping.

The way to form the groove in the weight is not limited in particular, either. For instance, it is possible to name the following methods: in the casting, a mold can be provided with a protrusion which has been formed in advance to correspond to the groove, and the weight having the groove can be cast with the mold; and the groove can be formed by pressing a plate-shaped zinc or zinc-based alloy plate to dent it partially.

In the double-sided tape applying step, one of the opposite adhesive surfaces of a double-sided tape can preferably be bonded onto one of the opposite surfaces of the weight. When one of the opposite adhesive surfaces of a double-sided tape is bonded onto one of the opposite surfaces of the weight, it is possible to readily manufacture the present wheel balance whose weight is assembled with a wheel by using the double-sided tape.

Further, the present manufacturing process can preferably further comprise a film forming step, in which a rust prevention film is formed on the opposite surfaces at least, before carrying out the double-sided tape applying step. Thus, it is possible to manufacture the present wheel balance weight which is provided with a rust prevention film.

Furthermore, the present manufacturing step can preferably further comprise a pre-treating step, in which the opposite surfaces of the weight cleansed, before carrying out the rust prevention film forming step. When the pre-treating step is carried out, it is possible to inhibit the resulting rust prevention coating from coming off which is often caused by dirt.

Moreover, the present manufacturing process can preferably further comprises a step of giving an identification mark to the opposite top surface of the weight. The way to give an identification mark to the opposite top surface of the weight is not limited in particular, either.

In addition, the present manufacturing step can preferably further comprise a weight cutting step in which the weight is cut to a predetermined length. When the weight is cut to a predetermined length, it is possible to give a desired mass to the weight.

The weight cutting step can be carried out at any time as far as it is carried out after the weight forming step. However, the cutting step can further preferably be carried out after carrying out a groove forming step. When the weight cutting step is carried out after a groove forming step, it is possible to cut the weight, which is composed of zinc or the zinc-based alloy, with ease. Specifically, it is possible to cut the weight at the groove whose thickness is thinner than the other portions.

Except for the above-described specific arrangements, the arrangements of the present manufacturing process are same as those of the present wheel balance weight. Therefore, the same specific arrangements will not be described herein in detail.

EXAMPLES

The present invention will be hereinafter described in detail with reference to specific examples.

Example No. 1

Manufacture of Wheel Balance Weight

In Example No. 1, a wheel balance weight as illustrated in FIGS. 1 through 4 was manufactured. The manufacturing method of the wheel balance weight of Example No. 1 will be hereinafter described with reference to FIGS. 1 through 4.

First of all, metallic materials, such as metallic zinc, metallic tin, metallic copper and metallic aluminum, were weighed by a predetermined amount, respectively. Then, the metallic materials were charged into a crucible, and were heated. Thus, the metallic materials were melted to prepare a molten alloy. According to an weight analysis, the molten alloy contained zinc in an amount of 95% by weight, tin in an amount of 0.01% by weight, copper in an amount of 1% by weight, aluminum in an amount of 3.84% by weight, and the inevitable impurities in an amount of less than 0.15% by weight.

Subsequently, the molten alloy was poured into a mold to manufacture a strip-shaped weight 2. Note that a plurality of grooves 21 were formed in one of the opposite surfaces of the weight 2. The grooves 21 crossed in the width-wise direction of the weight 2. The grooves 21 formed in the weight 2 had a letter "V"-shaped cross section when they were cut in the longitudinal direction of the weight 2 (or viewed in the direction perpendicular to the longitudinal direction of the weight 2).

Thereafter, the weight 2 was curved. For example, the weight 2 was curved by such means as pressing and rolling. The weight 2 was curved with a die so that it substantially conformed to a curved shape of an inner peripheral surface of a rim in a wheel when it was installed to the wheel. In this instance, the weight 2 was curved so that the opposite surface with the grooves 21 formed faced inwardly in the radial direction of the wheel. Additionally, the other curving method was tried in which a curved portion had been provided in a mold in advance and a weight was formed with the mold. By both of the die, which curved the portions disposed between the grooves 21 independently, and the mold, which curved the resulting weight entirely, it was possible to manufacture the curved weight 2.

One of the opposite adhesive surfaces of a double-sided tape 2 was adhered onto the other one of the opposite surfaces of the curved weight 2 in which no groove 21 was formed, or onto the opposite bottom surface of the curved weight 2 which was to face a rim in a wheel radially outwardly. Note that the weight 2 was inhibited from adhering to places other than a wheel when it was handled, because the other one of the opposite adhesive surfaces of the double-sided tape 3 was covered with a separator paper 31.

In accordance with the above-described steps, the wheel balance weight 1 of Example No. 1 was manufactured.

Installation of Wheel Balance Weight

Figure 5:
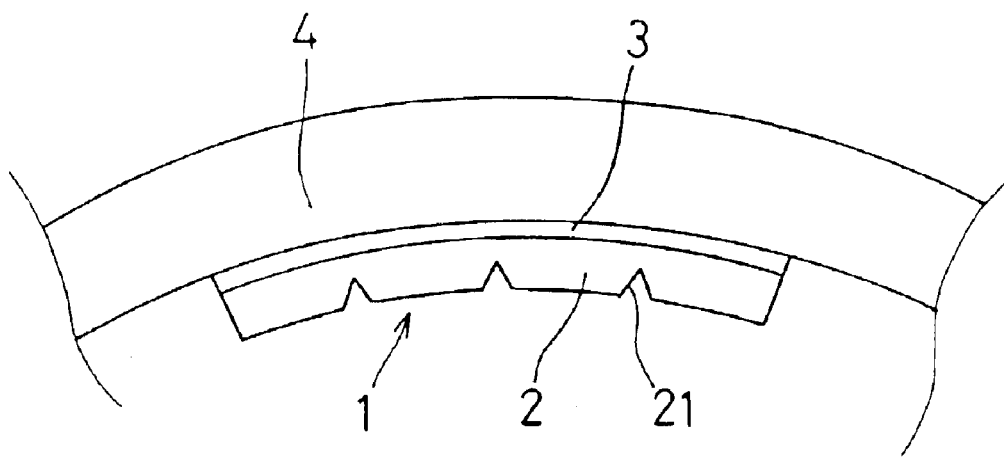
FIG. 5 is a schematic drawing for illustrating the wheel balance weight of Example No. 1 which is installed to a rim in a wheel.

The wheel balance weight 1 of Example No. 1 was actually installed to a wheel by the following procedure. Here, FIG. 5 illustrates how the wheel balance weight 1 was installed to an inner peripheral surface of a rim in a wheel 4.

First of all, the separator paper 31 was removed from the wheel balance weight 1 of Example No. 1 to expose the other opposite adhesive surface of the double-sided tape 3. Subsequently, the exposed opposite adhesive surface was bonded to a predetermined position in an inner peripheral surface of a rim in the wheel 4 to install the wheel balance weight 1 to the wheel 4. In this instance, it was possible to snugly fit the contacting portions of the weight 2 to the curved shape of the wheel 4 by pressing the weight 2 onto the rim in the wheel 4.

In the wheel balance weight 1 of Example No. 1, the weight 2 was curved more than the curvature of the inner peripheral surface of the rim in the wheel 4. Accordingly, when the wheel balance weight 1 was installed to the wheel 4, the curved weight 2 was pressed to snugly fit to the curved inner peripheral surface of the rim in the wheel 4. In this instance, the letter "V"-shaped grooves 21, which were formed in the opposite top surface of the weight 2, were contracted so that the weight 2 was fitted snugly to the wheel 4.

Example No. 2

Figure 6:
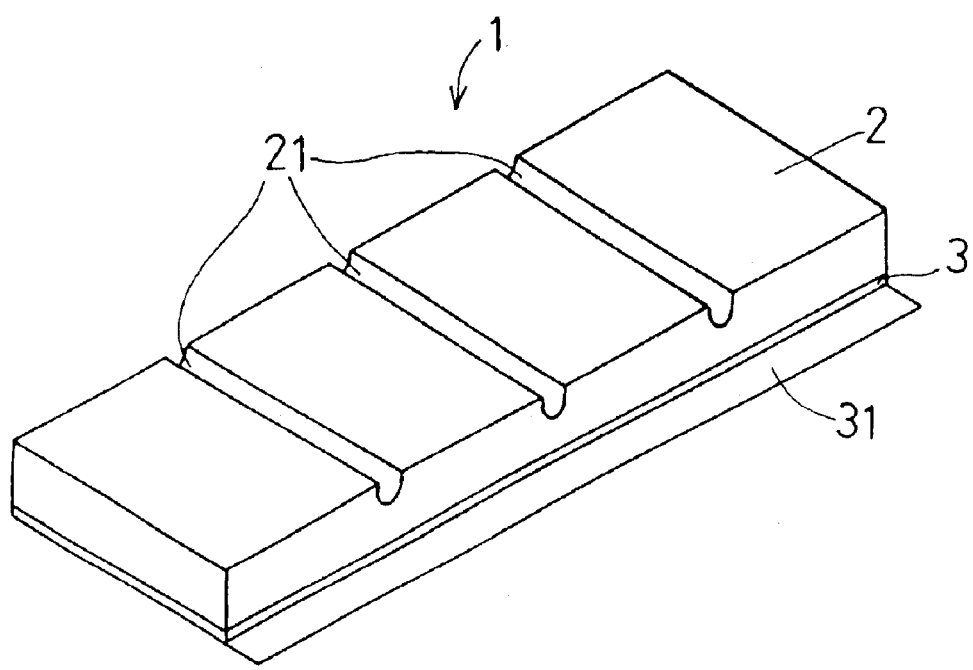
FIG. 6 is a perspective view for illustrating a completed wheel balance weight of Example No. 2 according to the present invention.

In Example No. 2, a wheel balance weight 1 as illustrated in FIG. 6 was manufactured. The wheel balance weight 1 is provided with a plate-shaped weight 2 in which grooves 21 having a letter "U"-shaped cross section were formed in one of the opposite surfaces.

In the wheel balance weight 1 of Example No. 2, the weight 2 was manufactured by press working.

Specifically, a zinc alloy plate which had the same alloy composition as that of the weight 2 of the wheel balance weight 1 of Example No. 1 was first cut to a strip shape. Then, the strip-shaped zinc alloy plate was pressed by a punch which had a predetermined shape to manufacture the weight 2 which was provided with the grooves 21 in one of the opposite surfaces of the strip-shaped zinc alloy plate. The grooves 21 herein had a letter "U"-shaped cross section, and crossed in the width-wise direction of the strip-shaped weight 2.

Subsequently, one of the opposite adhesive surfaces of a double-sided tape 2 was adhered onto the other one of the opposite surfaces of the weight 2 in which no groove 21 was formed.

In accordance with the above-described steps, the wheel balance weight 1 of Example No. 2 was manufactured. FIG. 6 illustrates the resulting wheel balance weight 1 of Example No. 2.

The wheel balance weight 1 of Example No. 2 could be installed to a wheel in the same manner as the wheel balance weight 1 of Example No. 1.

Example No. 3

A wheel balance weight 1 of Example No. 3 is a modified version of the wheel balance weight 1 of Example No. 2. Except that the grooves 21 had a letter "V"-shaped cross section, and that the portions of the weight 2 disposed between the respective grooves 21 were curved independently, the wheel balance weight 1 of Example No. 3 was the same as the wheel balance weight 1 of Example No. 2.

Specifically, a zinc alloy plate was cut to a strip shape in the same manner as Example No. 2. Then, a punch having a predetermined shape was pressed onto one of the opposite surfaces of the strip-shaped zinc alloy plate to form the grooves 21 which crossed in the width-wise direction of the weight 2 and which had a letter "V"-shaped cross section. Thereafter, the portions of the strip-shaped zinc plate disposed between the respective grooves 21 were curved independently by press forming. Finally, the strip-shaped zinc plate was cut to a predetermined length to manufacture the weight 2.

Subsequently, one of the opposite adhesive surfaces of a double-sided tape 2 was adhered onto the other one of the opposite surfaces of the weight 2 in which no groove 21 was formed.

Figure 7:
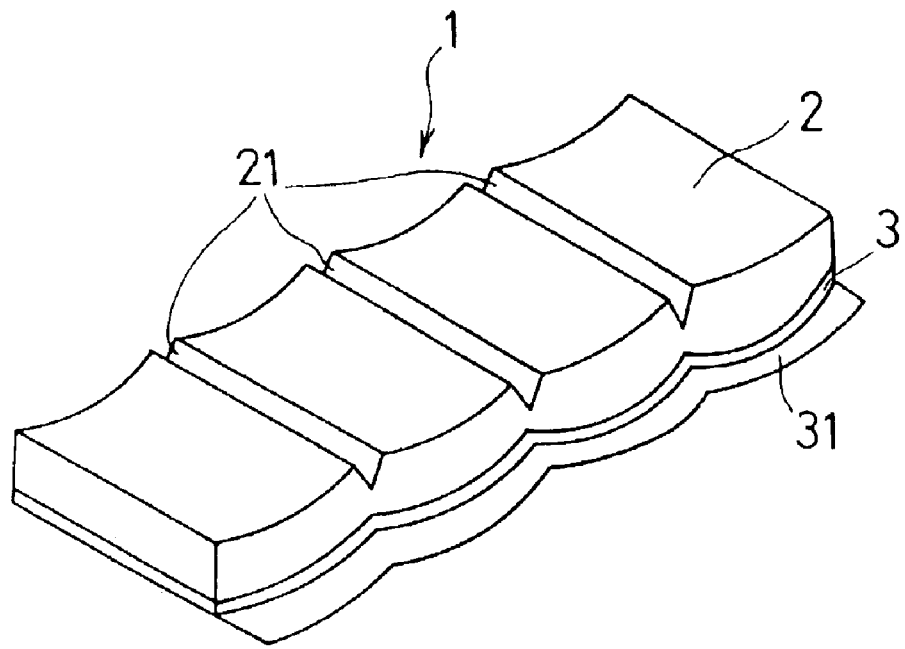
FIG. 7 is a perspective view for illustrating a completed wheel balance weight of Example No. 3 according to the present invention.

In accordance with the above-described steps, the wheel balance weight 1 of Example No. 3 was manufactured. FIG. 7 illustrates the resulting wheel balance weight 1 of Example No. 3.

The wheel balance weight 1 of Example No. 3 could be installed to a wheel in the same manner as the wheel balance weight 1 of Example No. 1.

Example No. 4

Except that the grooves 21 are formed in the opposite bottom surface of the weight 2, the wheel balance weight 1 of Example No. 4 was the same as the wheel balance weight 1 of Example No. 3.

Specifically, a zinc alloy plate was cut to a strip shape in the same manner as Example No. 3. Then, a punch having a predetermined shape was pressed onto one of the opposite surfaces of the strip-shaped zinc alloy plate to form the grooves 21 which crossed in the width-wise direction of the weight 2 and which had a letter "V"-shaped cross section. Thereafter, the portions of the strip-shaped zinc plate disposed between the respective grooves 21 were curved independently by press forming. Finally, the strip-shaped zinc plate was cut to a predetermined length to manufacture the weight 2.

Figure 12:
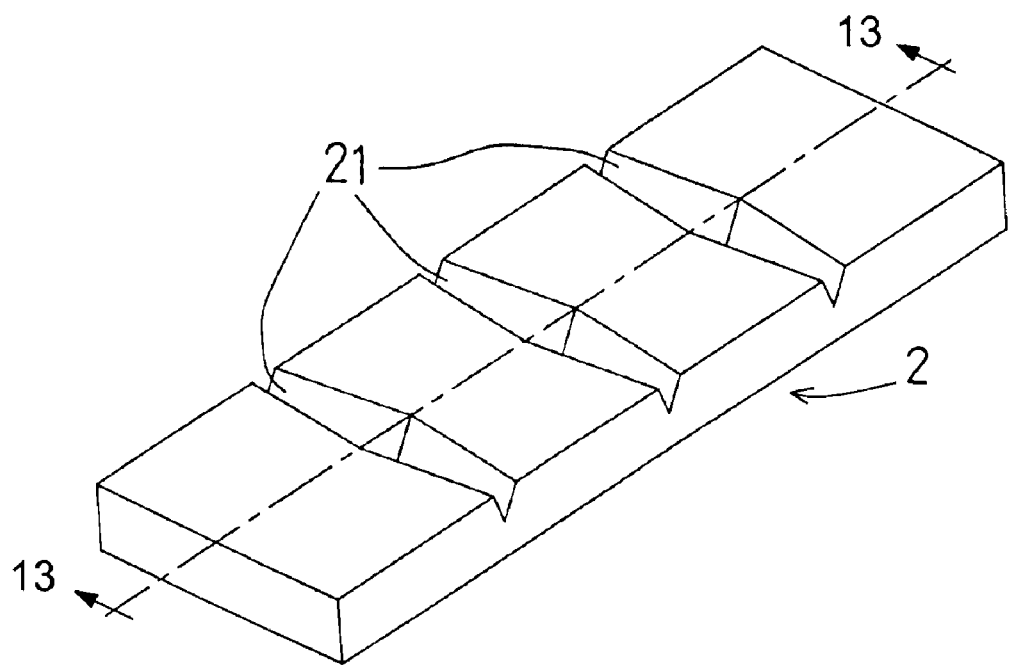
FIG. 12 is a perspective view illustrating a strip-shaped weight having grooves with a width varied from wide to narrow in the width-wise direction, outwardly from a central portion to the opposite ends.
Figure 13:
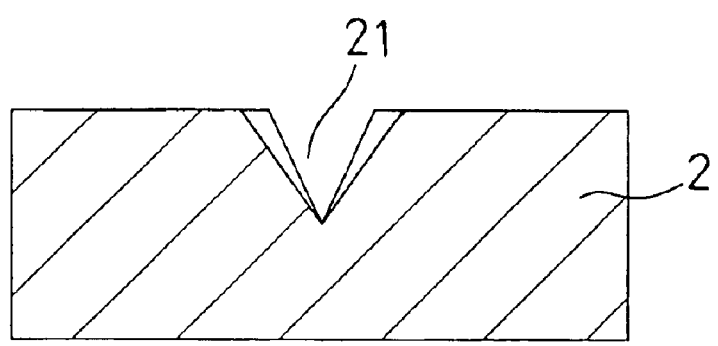
FIG. 13 is a sectional view taken along line 13—13 of FIG. 12.

In Example No. 4, note that the punch, which was pressed onto one of the opposite surfaces of the zinc alloy plate, was formed so that it had different shapes at the central portion than at the opposite ends in the leading end surface. Specifically, as shown in FIGS. 12 and 13, the resulting grooves 21 had a larger width at the central portion than at the opposite ends. Moreover, the grooves 21 were formed so that the width varied from wide to narrow in the width-wise direction outwardly from the central portion to the opposite ends.

In the thus manufactured weight 2 which was provided with the grooves 21 formed by the punch, there arose no burrs, flashes, and the like, on the width-wise opposite end surfaces. Specifically, the deformation magnitude of the texture at the central portion in the zinc alloy plate differed from the deformation magnitudes of the textures at the opposite ends therein. Accordingly, when the texture was moved by a plastic deformation from the central portion to the opposite ends, the textures at the opposite ends could absorb the texture, which was moved from the central portion. As a result, it was possible to inhibit the burrs, flashes, and so forth, which would have protruded in the width-wise direction, from taking place.

Subsequently, one of the opposite adhesive surfaces of a double-sided tape 2 was adhered onto one of the opposite surfaces of the weight 2 in which the grooves 21 were formed, or onto the opposite bottom surface of the weight 2 which was to face a rim in a wheel radially outwardly.

Figure 8:
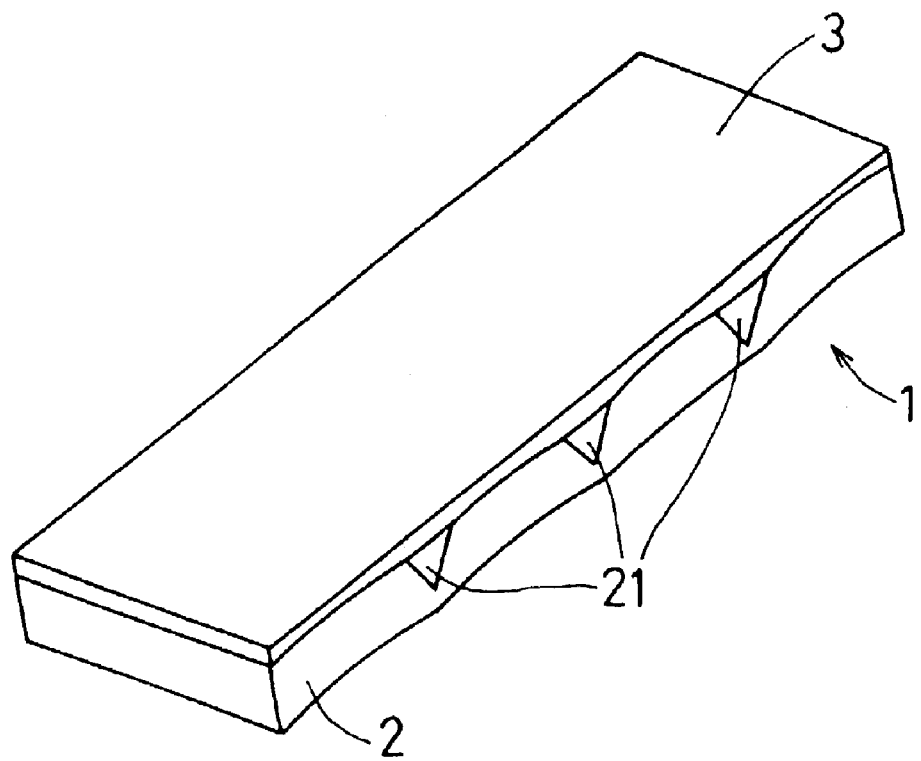
FIG. 8 is a perspective view for illustrating a completed wheel balance weight of Example No. 4 according to the present invention.

In accordance with the above-described steps, the wheel balance weight 1 of Example No. 4 was manufactured. FIG. 8 illustrates the resulting wheel balance weight 1 of Example No. 4.

In the same manner as the wheel balance weight 1 of Example Nos. 1 through 3, it was possible to install the wheel balance weight 1 of Example No. 4 by pressing the other one of the opposite adhesive surfaces of the double-sided tape 2 onto a predetermined position in an inner peripheral surface of a rim in a wheel. Note that, prior to the installation of the wheel balance weight 1 of Example No. 4 to a wheel, the wheel balance weight 1 was cut to adjust the mass of the wheel balance weight 1 to a desired mass. Specifically, the wheel balance weight 1 was cut by repeatedly bending the weight 2 back and forth at one of the grooves 21 until the weight 2 broke at the groove 21.

When the wheel balance weight 1 of Example No. 4 was pressed onto an inner peripheral surface of a rim in a wheel to install it to the wheel, the weight 2 was subjected to a stress, which expanded the weight 2 in the longitudinal direction, on the opposite bottom surface side, and another stress, which compressed the weight 2 in the longitudinal direction, on the opposite top surface side.

Due to the stresses, the width of the grooves 21 was enlarged on the opposite bottom surface side. When the width of the grooves 21 was thus enlarged at the opening, the weight 2 was curved so as to snugly fit to the curvature of the inner peripheral surface of the rim in the wheel. Simultaneously therewith, the weight 2 was adhered and fastened to the inner peripheral surface of the rim in the wheel.

In accordance with the above-described arrangements, it was possible to install the wheel balance weight 1 of Example No. 4 to the rim in the wheel with ease.

Having now fully described the present invention, it will be apparent to one of ordinary skill in the art that many changes and modifications can be made thereto without departing from the spirit or scope of the present invention as set forth herein including the appended claims.

What is claimed is:

1. A wheel balance weight, comprising:
   a weight composed of at least one member selected from the group consisting of zinc and a zinc-based alloy, said weight being formed as a substantially strip shape having a substantially uniform thickness and having opposite surfaces and a plurality of grooves, the plurality of grooves being formed in one of the opposite surfaces of the weight and crossing in a width-wise direction thereof;
   portions of the weight and said opposite surfaces located between said grooves being independently curved; and
   installation means for installing the weight to a rim in a wheel.

2. The wheel balance weight according to claim 1, wherein said installation means is a double-sided tape having opposite adhesive surfaces, one of the opposite adhesive surfaces to be bonded onto the weight, the other one of the opposite adhesive surfaces to be bonded onto the rim in the wheel.

3. The wheel balance weight according to claim 1, wherein said weight has a rust prevention film on the opposite surfaces at least.

4. The wheel balance weight according to claim 1, wherein the zinc-based alloy comprises zinc in an amount of 39.5% by weight or more when the entirety is taken as 100% by weight.

5. The wheel balance weight according to claim 1, wherein the zinc-based alloy comprises tin in an amount of less than 50% by weight, copper in an amount of less than 5% by weight, aluminum in an amount of less than 5% by weight, and the balance of zinc and impurities.

6. The wheel balance weight according to claim 1, wherein the plurality of grooves are formed in the one of the opposite surfaces of said weight which faces a wheel radially outwardly when the wheel balance weight is installed to the wheel.

7. The wheel balance weight according to claim 1, wherein the plurality of grooves have such a cross sectional shape that a width at an opening is greater than a width at a bottom when viewed in a direction perpendicular to a longitudinal direction of the weight.

8. A process for manufacturing a wheel balance weight, said process comprising the steps of:
   forming a weight composed of at least one member selected from the group consisting of zinc and a zinc-based alloy, the weight being formed as a substantially strip shape having a substantially uniform thickness and having opposite surfaces and a plurality of grooves, the plurality of grooves being formed in one of the opposite surfaces of the weight and crossing in a width-wise direction thereof;
   curving independent portions of the weight and said opposite surfaces between said grooves; and
   applying a double-sided tape, having opposite adhesive surfaces, to the weight so as to adhere one of the opposite adhesive surfaces onto one of the opposite surfaces of the weight.

9. The process according to claim 8, wherein, in said weight forming step, the weight is manufactured by casting at least one member selected from the group consisting of zinc and a zinc-based alloy.

10. The process according to claim 8, wherein, in said weight forming step, the weight is formed by pressing a plate-shaped member being composed of at least one member selected from the group consisting of zinc and a zinc-based alloy.

11. The process according to claim 8, further comprising a step of coating a rust prevention film on the opposite surfaces at least before carrying out said double-sided tape applying step.

12. A wheel balance weight comprising:
   a weight composed of at least one member selected from the group consisting of zinc and a zinc-based alloy, the weight being formed as a substantially strip shape having a substantially uniform thickness and having opposite surfaces and at least one groove, the at least one groove being formed in at least one of the opposite surfaces of the weight and crossing in a width-wise direction thereof, the at least one groove having a larger width at a central portion than at opposite ends; and installation means for installing the weight to a rim in a wheel.

13. The wheel balance weight according to claim 12, wherein said installation means is a double-sided tape having opposite adhesives surfaces, one of the opposite adhesive surfaces is bonded onto the weight, the other one of the opposite adhesive surfaces is to be bonded onto the rim in the wheel.

14. The wheel balance weight according to claim 12, wherein said weight has a rust prevention film on at least the opposite surfaces.

15. The wheel balance weight according to claim 12, wherein the zinc-based alloy comprises zinc in an amount of 39.5% by weight or more when the entirety is taken as 100% by weight.

16. The wheel balance weight according to claim 12, wherein the zinc-based alloy comprises tin in an amount of less than 50% by weight, copper in an amount of less than 5% by weight, aluminum in an amount of less than 5% by weight, and a balance of zinc and impurities.

17. The wheel balance weight according to claim 12, wherein the at least one groove is formed in one of the opposite surfaces of said weight which faces a wheel radially outwardly when the wheel balance weight is installed to the wheel.

18. The wheel balance weight according to claim 12, wherein the at least one groove has such a cross sectional shape that a width at an opening is greater than a width at a bottom when viewed in a direction perpendicular to a longitudinal direction of the weight.

19. The wheel balance weight according to claim 12, wherein said weight is curved so as to go along an inner peripheral surface of a rim in a wheel.

20. A process for manufacturing a wheel balance weight, said process comprising the steps of:

forming a weight composed of at least one member selected from the group consisting of zinc and a zinc-based alloy, the weight being formed as a substantially strip shape having a substantially uniform thickness and having opposite surfaces and at least one groove, the at least one groove being formed in at least one of the opposite surfaces of the weight and crossing in a width-wise direction thereof, the groove having a larger width at a central portion than at opposite ends; and applying a double-sided tape, having opposite adhesive surfaces, to the weight so as to adhere one of the opposite adhesive surfaces onto one of the opposite surfaces of the weight.

21. The process according to claim 20, wherein, in said weight forming step, the weight is manufactured by casting at least one member selected from the group consisting of zinc and a zinc-based alloy.

22. The process according to claim 20, wherein, in said weight forming step, the weight is formed by pressing a plate-shaped member being composed of at least one member selected from the group consisting of zinc and a zinc-based alloy.

23. The process according to claim 20, further comprising a step of coating a rust prevention film on the opposite surfaces at least before carrying out said double-sided tape applying step.

* * * * *